United States Patent [19]
Yonezawa

[11] Patent Number: 5,574,960
[45] Date of Patent: Nov. 12, 1996

[54] METHOD OF SEPARATING EXOTHERMIC ELEMENTS FROM HIGH-LEVEL RADIOACTIVE LIQUID WASTE

[75] Inventor: Shigeaki Yonezawa, Naka-gun, Japan

[73] Assignee: Doryokuro Kakunenryo Kaihatsu Jigyodan, Tokyo-to, Japan

[21] Appl. No.: 520,784

[22] Filed: Aug. 30, 1995

[30] Foreign Application Priority Data

Jan. 19, 1995 [JP] Japan .................................. 7-006216

[51] Int. Cl.$^6$ .................................................. C22B 26/00
[52] U.S. Cl. .......................... 423/11; 423/158; 423/184; 210/725; 210/727
[58] Field of Search .......................... 423/11, 158, 184; 210/724, 725, 726, 727, 728

[56] References Cited

U.S. PATENT DOCUMENTS

| | | | |
|---|---|---|---|
| 4,770,783 | 9/1988 | Gustavsson et al. | 210/638 |
| 4,790,960 | 12/1988 | Heckmann et al. | 252/631 |
| 4,804,498 | 2/1989 | Mizuno et al. | 252/628 |
| 5,144,063 | 9/1992 | Sullivan | 562/7 |

OTHER PUBLICATIONS

Preliminary Report of 1994 Fall Meeting of the Atomic Energy Society of Japan (Sep. 28–30, 1994): "M8 Behavior Of Strontium During Denitration Of HLLW With Formic Acid", published on Sep. 5, 1994.

Preliminary Report of 1993 Spring Meeting of the Atomic Energy Society of Japan (Mar. 27–29, 1993): "H40 Separation Of Heat–Generating Elements From HLLW By Denitration", published on Mar. 10, 1993.

Primary Examiner—Ngoclan Mai
Attorney, Agent, or Firm—Wenderoth, Lind & Ponack

[57] ABSTRACT

A method of separating exothermic elements of Cs and Sr from a high-level radioactive liquid waste. The method comprises a denitration step wherein formic acid is added to the high-level liquid waste so as to adjust its pH to about 5, thereby causing most of the elements other than Cs and Sr to precipitate in the high-level liquid waste to obtain a denitrated liquid waste containing Cs and Sr in high concentrations. The denitrated liquid waste is then subjected to a pH adjustment step wherein ammonia is added to the denitrated liquid waste so as to adjust its pH to about 7.5 to 9, thereby removing by precipitation the elements other than Cs and Sr remaining in the denitrated liquid waste. When the thus resulting precipitate freed of Cs and Sr is vitrified, the waste content in the vitrified waste can be increased.

3 Claims, 3 Drawing Sheets

METHOD OF SEPARATING EXOTHERMIC ELEMENTS FROM HIGH-LEVEL RADIOACTIVE LIQUID WASTE

BACKGROUND OF THE INVENTION

The present invention relates to a method of efficiently removing Cs and Sr (hereinafter collectively referred to as "exothermic elements") from a high-level radioactive liquid waste (hereinafter referred to simply as "high-level liquid waste") generated in the step of reprocessing spent nuclear fuels, prior to solidification, such as vitrification or glassification, of the high-level liquid waste. The content of such exothermic elements in a vitrified waste is important for safe storage of the vitrified waste.

A spent nuclear fuel generated in, for example, nuclear power stations contains plutonium and uranium which are fissionable substances. In order to reuse these elements, the spent nuclear fuel is reprocessed to thereby separate and recover plutonium and uranium. In this process, a high-level liquid waste is produced which comprises an aqueous nitrate solution containing fission products and the like. Not only does this high-level liquid waste exhibit a high calorific value (decay heat) attributed to the decay of radioactive substances and also a high level of radioactivity but also the lifetimes of radioactive substances contained therein are so long that, after safe custody with special attention, it must ultimately be isolated from the zone of human life. Although the high-level liquid waste is now mostly stored in the form of an aqueous solution, it is partly stored in the form of a more stable solidified waste such as glass. This solidified waste as means for disposing of the high-level liquid waste can be safely isolated from the zone of human life for a prolonged period of time by first storing the same for tens of years for cooling and thereafter disposing of it in a stratum as deep as hundreds of meters underground.

The vitrified waste is generally air cooled during its storage so as to prevent its temperature from exceeding the predetermined operating temperature because glass has the property of crystallizing when held at a high temperature for a prolonged period of time to thereby change its characteristics. The cooling capacity depends on the cooling system, i.e., forced cooling or natural cooling of the storage facilities and the cooling capacity design worked out for the storage facilities. Therefore, the upper limit of the waste content in the vitrified waste must be set in accordance with the cooling capacity of the storage facilities so that the maximum temperature of the vitrified waste does not exceed the predetermined operating temperature. The maximum predetermined operating temperature for the currently produced vitrified waste is, for example, about 600° C.

After being stored as described above, the vitrified waste is disposed of in a stratum. Thermal influences on disposal sites, such as thermal stress, heat convection of underground water stream, and deformation of peripheral materials must be minimized.

Most of the radioactivity and calorific value of the high-level liquid waste originate in radioactive isotopes of cesium (Cs) and strontium (Sr), as fission products, and daughter nuclides thereof. For example, with respect to the high-level liquid waste generated in the reprocessing of spent nuclear fuels after a lapse of four years from the takeout from a reactor core at a burnup of 45,000 MWd/tU, the calorific value of Cs and Sr plus Ba and Y that are in radioactive equilibrium therewith accounts for about 65% of the total calorific value. This value approaches 90% after a lapse of 30 years.

Therefore, removing by separation Cs and Sr from the high-level liquid waste followed by solidifying the Cs- and Sr-free liquid waste enables a reduction of the calorific value of the solidified waste, thereby enabling an increase of the waste content of the solidified waste with the result that the waste output can be minimized and a volume reduction can be achieved.

Techniques for separating Cs and Sr from the high-level liquid waste have been proposed which include, for example, one proposed by the same assignee as in the present application in which formic acid is added to the high-level liquid waste to thereby effect denitration [Abstracts of 1993 Spring Meeting of the Atomic Energy Society of Japan, H40 (published on Mar. 10, 1993)]. That is, denitration of the high-level liquid waste with formic acid increases the pH of the liquid waste, and most of the elements other than Cs and Sr (e.g., Mo, Zr, Fe and Y) are precipitated while Cs and Sr remain in the liquid waste by regulating the amount of added formic acid so that the pH of the liquid waste after the denitration fails in the neutral zone of 6 to 7.5 as shown in FIG. 3. Thus, removing the precipitate by separation enables crude separation of exothermic elements consisting of Cs and Sr from the other elements.

However, the actual high-level liquid waste contains tens of varieties of elements and their contents are so widely varied as to provide a complex composition, so that it is difficult to accurately adjust the pH of the liquid waste after the denitration to a given value of the neutral zone in the denitration conducted by adding formic acid. Especially, when the pH of the liquid waste after the denitration exceeds the given range of the neutral zone and is increased to fall on the alkaline side of pH 8 to 9, the problem has arisen that only about 10% of Sr remains in the liquid waste with about 90% thereof being precipitated while Fe and Y are completely precipitated with 90% or more of Cs still remaining in the liquid waste as shown in the graph of FIG. 4, so that the separability of Sr is deteriorated.

SUMMARY OF THE INVENTION

An object of the present invention is therefore to provide a method of separating exothermic elements from the high-level liquid waste, which enables efficient separation of exothermic elements of Cs and Sr while preventing the deterioration of the separability of, especially, Sr in the denitration of the high-level liquid waste with formic acid.

The method of separating exothermic elements from a high-level liquid waste according to the present invention comprises a denitration step wherein formic acid is added to a high-level liquid waste of an aqueous nitrate solution so as to adjust its pH to approximately 5, thereby causing most of the elements other than the exothermic elements consisting of Cs and Sr to precipitate in the high-level liquid waste with the result that a denitrated liquid waste containing the exothermic elements in high concentrations is obtained; and a pH adjustment step wherein ammonia is added to the denitrated liquid waste obtained in the above denitration step so as to adjust its pH to approximately 7.5 to 9, thereby removing by precipitation the elements other than the exothermic elements remaining in the denitrated liquid waste.

It is possible to remove the precipitate formed in the denitration step by, for example, filtration from the denitrated liquid waste and use the resultant precipitate-free liquid waste in the pH adjustment step, or alternatively, to use, without removing the precipitate formed in the denitration step, the denitrated liquid waste as such in the pH adjustment step.

In the first step of denitration of the present invention, formic acid is added to the extent of relatively low pH at which there is no danger of Sr precipitation, namely, a pH value of approximately 5. At such a low pH, no complete precipitation of the elements other than the exothermic elements can be attained. However, it will suffice when the elements which can precipitate under this condition are precipitated or the elements are precipitated as much as precipitation occurs under this condition for the time being.

In the subsequent pH adjustment step, ammonia is added so as to adjust the pH of the denitrated liquid waste to approximately 7.5 to 9, thereby accomplishing almost complete precipitation of the elements other than the exothermic elements remaining without being precipitated in the denitration step. In this step, most of Sr contained in the liquid waste can remain therein together with Cs without being precipitated.

The exothermic elements contained in the high-level liquid waste can be effectively separated from the other elements by removing by separation the precipitate thus formed in the pH adjustment step.

PREFERRED EMBODIMENTS OF THE INVENTION

The present invention will now be described in detail with reference to the flow sheet of FIG. 1 according to one embodiment of the invention.

The high-level liquid waste comprising an aqueous nitrate solution to be treated in the present invention is a liquid waste of extraction discharged from the co-decontamination cycle in which uranium and plutonium are separated from the fission products by extracting a solution of spent nuclear fuel in nitric acid with a solvent. Such high-level liquid waste contains extraction residues, fission products, actinoids, alkali salts, corrosion products, etc., and the nitric acid concentration thereof is usually about 2.5N.

Figure 4:
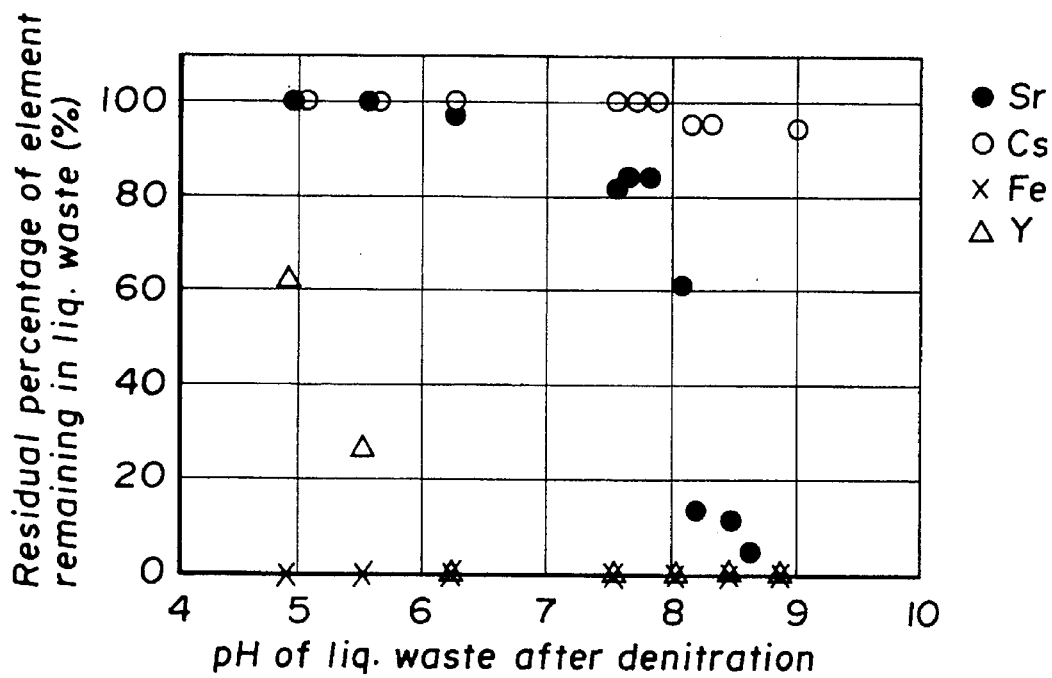
FIG. 4 is another graph showing the relationship between the pH of the liquid waste after denitration with formic acid and the residual percentage of each element.

In the present invention, first, the denitration step wherein formic acid is added to the high-level liquid waste so as to adjust its pH to approximately 5 is conducted for removing the radioactive isotopes of Cs and Sr as the exothermic elements contained in the high-level liquid waste. At a pH value of about 5, there are elements other than the exothermic elements which are completely precipitated and also those which are not satisfactorily precipitated but remain in the high-level liquid waste. This does not pose any problem in the present invention because the elements which are not satisfactorily precipitated in the denitration step but remain in the high-level liquid waste can be precipitated in the subsequent pH adjustment step. The most principal reason for the employment in the denitration step of a pH value as low as 5 at which the elements other than the exothermic elements are not completely precipitated is to avoid the danger of Sr precipitation which would occur in the alkaline zone of about pH 8 in which the elements other than the exothermic elements are completely precipitated (see FIG. 4).

Although formic acid is appropriately added in an amount necessary for adjusting the pH of the high-level liquid waste to about 5, as a rule of thumb, it is generally added so as to adjust the molar ratio of formic acid to nitric acid contained in the high-level liquid waste ([HCOOH]/[HNO$_3$]) to approximately 1.7.

In the execution of the denitration step, the high-level liquid waste is loaded with formic acid while being heated at about 90° to 95° C., i.e., a temperature lower than the boiling point of the high-level liquid waste so that the pH of the high-level liquid waste is adjusted to 5 and allowed to cool by standing it still at room temperature for 10 to 15 hr to thereby complete the denitration reaction. After the denitration, the high-level liquid waste is filtered to thereby separate and remove a precipitate. Thus, a denitrated liquid waste is obtained as a filtrate.

Figure 2:
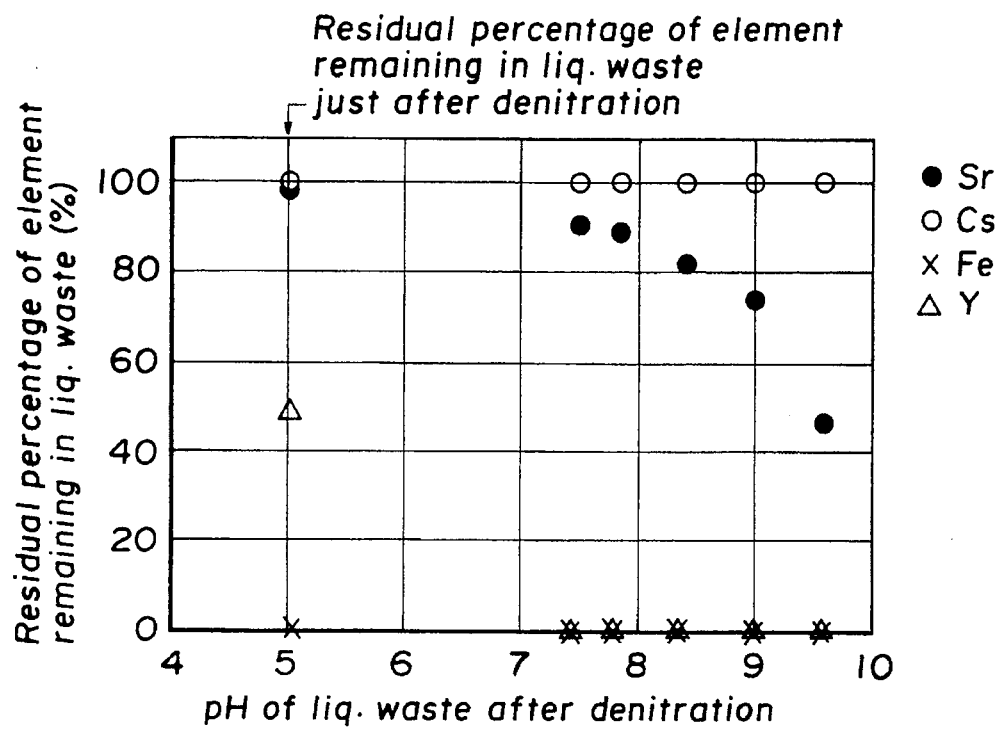
FIG. 2 is a graph showing the residual percentage of each element remaining in the liquid waste after denitration at a pH of 5 and further the relationship between the pH of the liquid waste after pH adjustment and the residual percentage of each element.
Figure 3:
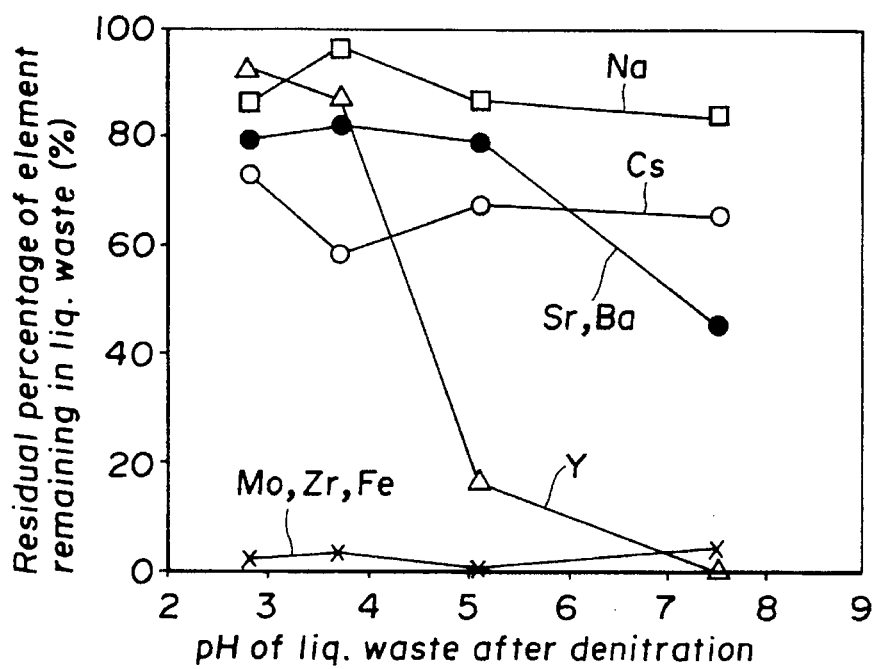
FIG. 3 is a graph showing the relationship between the pH of the liquid waste after denitration with formic acid and the residual percentage of each element.

The resulting denitrated liquid waste has been analyzed for the residual percentage of each element remaining therein after denitration of the high-level liquid waste ([concentration of element in the denitrated liquid waste]/[concentration of element in the high-level liquid waste before denitration]). As a result, it has been found that, as shown in the graph of FIG. 2 at the position of a pH value of 5, about 90% or more of the exothermic elements of Cs and Sr remain in the liquid waste but, with respect to the other elements, for example, Fe is completely precipitated and Y is precipitated in an amount of about 50% with the rest remaining in the liquid waste. In this connection, the high-level liquid waste to be treated contains Na which is an alkali metal element homologous to Cs and Ba which is an alkaline earth metal element homologous to Sr, and most of these remain in the denitrated liquid waste similarly to Cs and Sr.

Subsequently, ammonia is added to the denitrated liquid waste obtained in the denitration step which contains the exothermic elements in high concentrations so as to adjust the pH of the liquid waste to approximately 7.5 to 9. This pH adjustment is carried out over a satisfactory period of time until the pH is stabilized.

The elements other than the exothermic elements, which have not completely been precipitated in the denitration step, are substantially entirely precipitated in this pH adjustment step. The relationship between the pH of the liquid waste obtained by filtering off the formed precipitate and the residual percentage of each element remaining in the liquid waste is shown in FIG. 2. In the graph of FIG. 2, the data at a pH value of 5 indicate the residual percentage of each element remaining in the liquid waste just after denitration and the other data indicate the residual percentage of each element remaining in the liquid waste after pH adjustment. It is apparent from this graph that the elements other than the exothermic elements remaining in the denitrated liquid waste, for example, Fe and Y have almost completely been precipitated by adding ammonia to adjust the pH of the liquid waste to 7.5 or higher. When the pH of the liquid waste is increased to 9.5 by further addition of ammonia, however, one of the exothermic elements, i.e., Sr also tends to be precipitated. Therefore, it is requisite that the pH of the liquid waste be adjusted so as to range from approximately 7.5 to 9 in the pH adjustment step.

Na and Ba also remain together with the exothermic elements of Cs and Sr in the denitrated liquid waste after pH adjustment.

When the pH adjustment comprising the addition of ammonia to the denitrated liquid waste is carried out in an atmospheric environment, the tendency is recognized that Sr contained in the liquid waste whose pH is high and falls in the alkaline zone reacts with carbon dioxide contained in the atmosphere to thereby form $SrCO_3$ and precipitate. Therefore, it is desired that the pH adjustment be carried out in a $CO_3$-free glove box. For the same reason, it is desired that the added ammonia be previously decarbonated.

The exothermic elements of Cs and Sr contained in the high-level liquid waste can efficiently be separated from the other elements by carrying out the above denitration and pH adjustment steps.

Figure 1:
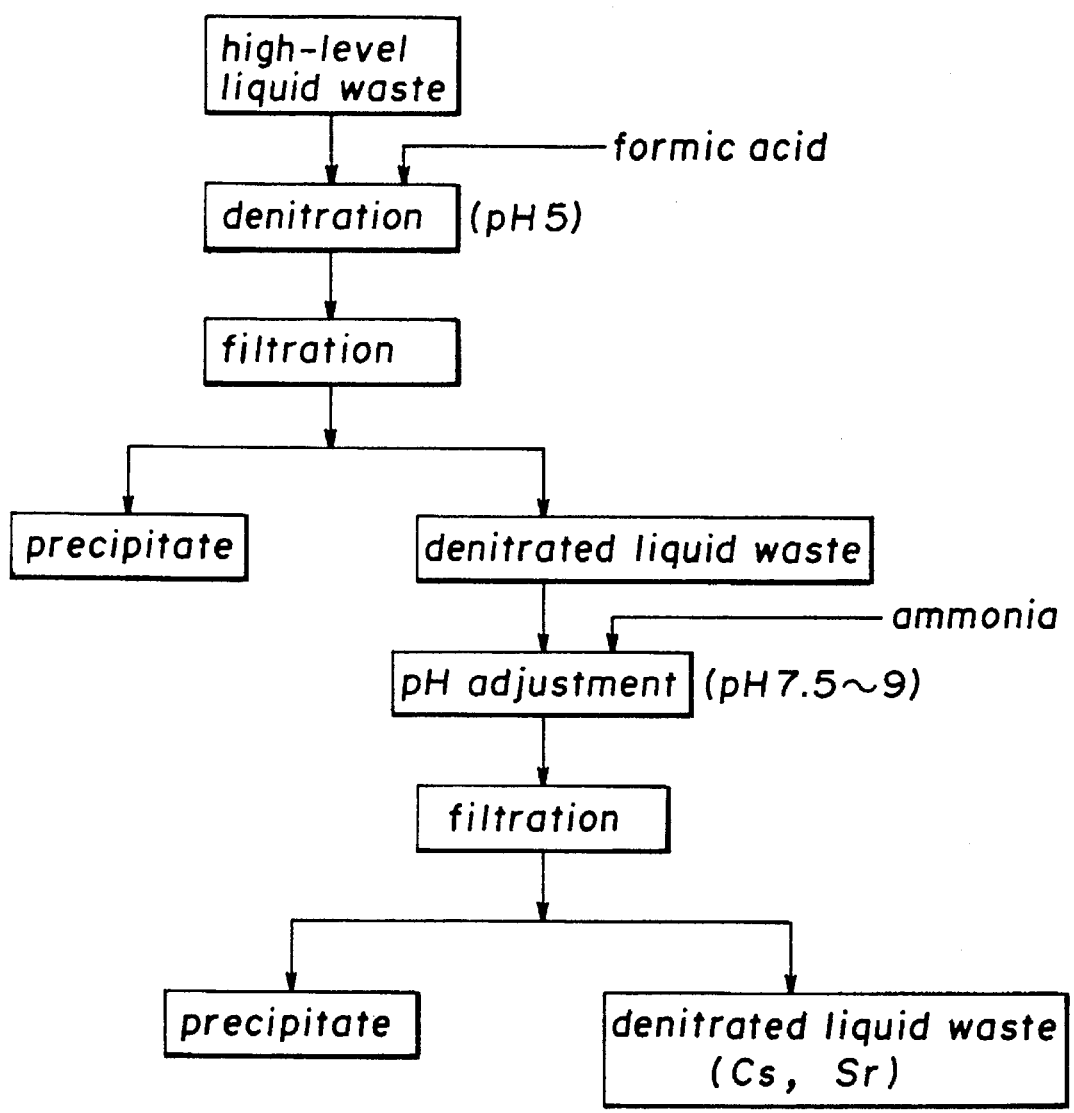
FIG. 1 is a flow sheet illustrating an embodiment of the method of the present invention.

In the above embodiment of the present invention illustrated in the flow sheet of FIG. 1, the precipitate formed in the denitration step is removed by filtration from the liquid waste and the resulting precipitate-free liquid waste is used in the pH adjustment step. This is, however, not critical and it is not disadvantageous at all to use, without filtering off the precipitate formed in the denitration step, the precipitate-containing liquid waste as such in the pH adjustment step.

The half-lives of the radioactive isotopes of Cs and Sr, for example, $^{137}Cs$ and $^{90}Sr$ contained in the liquid waste after pH adjustment are each about 30 years, which are short as compared with those of long-lived nuclides such as other actinoid elements contained in the high-level liquid waste. Therefore, the separated Cs and Sr can be converted into a low-level waste by storing them for a required period of time to thereby lower the radioactivity level thereof.

On the other hand, the precipitates of the elements other than the exothermic elements that have been separated in the denitration and pH adjustment steps do not contain Cs and Sr, so that vitrification thereof enables a reduction in the calorific value of the vitrified waste.

EXAMPLE

Denitration step 100 ml of a simulated high-level liquid waste (nitric acid concentration: 2.5N) was put in a separable flask and heated at 95° C. under the total reflux condition. Then, formic acid was fed thereinto at a rate of 0.4 ml/min so that the molar ratio of the fed formic acid to the nitric acid concentration of the high-level liquid waste ($[HCOOH]/[HNO_3]$) was 1.7. After the completion of the feeding of formic acid, the reaction mixture was held undisturbed for 6 hr and cooled at room temperature for 15 hr. Thereafter, the pH was measured, which was thus found to be 5.05.

Formed precipitate was filtered off by the use of a membrane filter of 0.45 μm in pore size, thereby obtaining a denitrated liquid waste as a filtrate. The element concentrations of the denitrated liquid waste were measured by means of ICP emission spectrophotometer (ICPS-1000TR, manufactured by Shimadzu Corp.) and atomic absorption photometer (Z-8100, manufactured by Hitachi, Ltd.) to calculate the residual percentage of each element ([concentration of element in the denitrated liquid waste]/[concentration of element in the high-level liquid waste before denitration]). The results are given in Table 1.

pH adjustment step 1N ammonia was added to aliquot portions of the denitrated liquid waste obtained in the denitration step so as to adjust them to various pH values. The ammonia addition was conducted at room temperature and agitation was effected until the pH of each liquid waste portion was stabilized. After the stabilization, the pH values were 7.46, 7.80, 8.34, 9.00 and 9.58.

The precipitate formed in each portion was filtered off by the use of a membrane filter of 0.45 μm in pore size, thereby obtaining a liquid waste that has undergone pH adjustments as a filtrate. The element concentrations of the liquid waste portions were measured by the use of the same instruments to calculate the residual percentage of each element. The results are jointly given in Table 1.

TABLE 1

| | | Residual percentage of element remaining in the denitrated liquid waste (%) | | | | | |
|---|---|---|---|---|---|---|---|
| | | after denitration with formic acid | pH after pH adjustment | | | | |
| Group | Element | (pH 5.05) | 7.46 | 7.80 | 8.34 | 9.00 | 9.58 |
| 1a | Na | 99.36 | 92.93 | 92.04 | 92.71 | 92.46 | 91.06 |
| 1a | Cs | 100 | 100 | 100 | 100 | 100 | 100 |
| 2a | Sr | 92.99 | 91.00 | 89.11 | 81.54 | 74.55 | 47.08 |
| 2a | Ba | 100 | 98.73 | 95.66 | 86.56 | 72.75 | 16.70 |
| 3a | Y | 48.80 | 0.02 | 0.00 | 0.00 | 0.00 | 0.00 |
| 3a | La | 31.58 | 0.71 | 0.00 | 0.00 | 0.00 | 0.00 |
| 3a | Ce | 23.17 | 0.33 | 0.00 | 0.00 | 0.00 | 0.00 |
| 3a | Pr | 22.18 | 0.31 | 0.00 | 0.00 | 0.00 | 0.00 |
| 3a | Nd | 26.86 | 0.44 | 0.05 | 0.00 | 0.00 | 0.00 |
| 3a | Sm | 23.52 | 0.00 | 0.00 | 0.00 | 0.00 | 0.00 |
| 3a | Eu | 26.64 | 0.00 | 0.00 | 0.00 | 0.00 | 0.00 |
| 3a | Gd | 31.42 | 0.21 | 0.00 | 0.00 | 0.00 | 0.40 |
| 4a | Zr | 0.03 | 0.00 | 0.00 | 0.00 | 0.00 | 0.00 |
| 6a | Cr | 0.00 | 0.00 | 0.00 | 0.00 | 0.00 | 0.00 |
| 6a | Mo | 0.02 | 0.03 | 0.10 | 0.63 | 10.75 | 26.55 |
| 7a | Mn | 100 | 55.98 | 14.34 | 0.00 | 0.00 | 0.00 |
| 8 | Fe | 0.45 | 0.00 | 0.00 | 0.00 | 0.00 | 0.00 |
| 8 | Ni | 100 | 7.73 | 2.44 | 1.34 | 6.23 | 25.80 |

TABLE 1-continued

| | | Residual percentage of element remaining in the denitrated liquid waste (%) | | | | | |
|---|---|---|---|---|---|---|---|
| | | after denitration with formic acid | pH after pH adjustment | | | | |
| Group | Element | (pH 5.05) | 7.46 | 7.80 | 8.34 | 9.00 | 9.58 |
| 8 | Ru | 0.00 | 0.00 | 0.00 | 0.00 | 0.00 | 0.00 |
| 8 | Rh | 0.87 | 0.35 | 0.34 | 0.34 | 0.65 | 1.70 |
| 8 | Pd | 0.13 | 0.00 | 0.00 | 0.00 | 0.00 | 0.16 |
| 1b | Ag | 9.29 | 0.19 | 0.02 | 0.03 | 0.00 | 0.00 |
| 2b | Cd | 76.81 | 16.22 | 6.20 | 1.47 | 1.60 | 3.92 |
| 4b | Sn | 27.97 | 0.00 | 0.00 | 0.00 | 0.00 | 0.00 |
| 5b | P | 0.00 | 0.00 | 0.00 | 0.00 | 0.00 | 0.00 |
| 6b | Se | 4.19 | 0.58 | 1.65 | 2.26 | 2.22 | 8.06 |
| 6b | Te | 0.92 | 0.00 | 0.53 | 0.00 | 2.13 | 4.67 |

Note: 100% was given whenever the calculated residual percentage value exceeded 100%.

As apparent from Table 1, 100% of Cs and 93% of Sr remain in the liquid waste and further most of Na, Ba, Mn and Ni remain in the liquid waste without being precipitated in the denitration step. Still further, not only Y, La and other Group IIIa elements but also Cd, Sn, etc., remain in considerable proportions in the liquid waste. However, the addition of ammonia to the denitrated liquid waste to carry out the pH adjustment causes most of the Group IIIa elements to precipitate at a pH value of about 7.5 and further causes most of Mn, Ni, Cd, Sn and homologues thereof to precipitate at a pH value of about 8.5. Thus, these can be removed from the liquid waste. On the other hand, the exothermic elements of Cs and Sr along with Na and Ba mostly remain in the liquid waste even after the pH adjustment.

It is understood from the foregoing description that the present invention efficiently separates Cs and Sr accounting for a large proportion of the calorific value from the high-level liquid waste and gives Cs- and Sr-free precipitate as the residue. Vitrification or solidification with asphalt of this precipitate enables a reduction in the calorific value of the resulting solidified waste. Therefore, even if the waste content in the solidified waste is increased, the temperature of the solidified waste during storage can be suppressed so as not to exceed the upper limit set for preventing its crystallization. Moreover, an increase in the waste content in the solidified waste enables a reduction in the volume of the solidified waste as compared with that which results when neither Cs nor Sr is separated.

When the solidified wastes are disposed of in a deep stratum, the distance between neighboring solidified wastes can be rendered small because of the reduction in the calorific value per solidified waste, so that the locational density of solidified wastes in the disposal site can be raised. As a result, the disposal site can be made small. Further a reduction in the size of the disposal site would be feasible by taking into account that the volume of the solidified wastes can be reduced by increasing the waste content in each solidified waste.

The half-lives of the radioactive isotopes of Cs and Sr, for example, $^{137}$Cs and $^{90}$Sr separated from the high-level liquid waste are each about 30 years, which are short as compared with those of long-lived nuclides such as other actinoid elements contained in the high-level liquid waste. Therefore, the separated Cs and Sr can be converted into a low-level waste by storing them for a required period of time to thereby lower the radioactivity level thereof. It is not necessary to dispose of the low-level waste in a deep stratum, so that the disposal thereof is not expensive, thereby enabling cost reduction. Furthermore, the separated Cs and Sr can be effectively utilized as a radiation source or heat source according to necessity.

What is claimed is:

1. A method of separating exothermic elements from a high-level radioactive liquid waste which comprises a denitration step wherein formic acid is added to a high-level radioactive liquid waste of an aqueous nitrate solution so as to adjust its pH to approximately 5, thereby causing most of the elements other than exothermic elements consisting essentially of Cs and Sr to precipitate in the high-level radioactive liquid waste with the result that a denitrated liquid waste containing the exothermic elements in high concentrations is obtained; and a pH adjustment step wherein ammonia is added to the denitrated liquid waste obtained in the above denitration step so as to adjust its pH to approximately 7.5 to 9, thereby removing by precipitation the elements other than the exothermic elements remaining in the denitrated liquid waste.

2. The method according to claim 1, wherein the denitrated liquid waste obtained in the denitration step is used in the pH adjustment step after removing the precipitate formed in the denitration step therefrom.

3. The method according to claim 1, wherein the precipitate-containing denitrated liquid waste obtained in the denitration step is used as such in the pH adjustment step without removing the precipitate formed in the denitration step therefrom.

* * * * *